US011881932B2

(12) United States Patent
Yue et al.

(10) Patent No.: US 11,881,932 B2
(45) Date of Patent: Jan. 23, 2024

(54) RANDOM PHASE MODULATION METHOD DEPENDING ON COMMUNICATION DISTANCE

(71) Applicant: University of Electronic Science and Technology of China, Chengdu (CN)

(72) Inventors: Guangrong Yue, Chengdu (CN); Daizhong Yu, Chengdu (CN); Lin Yang, Chengdu (CN)

(73) Assignee: University of Electronic Science and Technology of China, Chengdu (CN)

( * ) Notice: Subject to any disclaimer, the term of this patent is extended or adjusted under 35 U.S.C. 154(b) by 0 days.

(21) Appl. No.: 18/033,375

(22) PCT Filed: Apr. 29, 2021

(86) PCT No.: PCT/CN2021/090943
§ 371 (c)(1),
(2) Date: Apr. 24, 2023

(87) PCT Pub. No.: WO2022/095369
PCT Pub. Date: May 12, 2022

(65) Prior Publication Data

US 2023/0421284 A1 Dec. 28, 2023

(30) Foreign Application Priority Data

Nov. 4, 2020 (CN) ......................... 202011213369.2

(51) Int. Cl.
*H04K 1/00* (2006.01)

(52) U.S. Cl.
CPC .................................... *H04K 1/006* (2013.01)

(58) Field of Classification Search
CPC . H04K 1/006; H04B 7/02; H04B 7/04; H04B 7/06; H04B 7/0613; H04B 7/0667;
(Continued)

(56) References Cited

U.S. PATENT DOCUMENTS 6,359,923 B1 * 3/2002 Agee ...................... H04L 5/0021 375/135
6,373,434 B1 * 4/2002 Hayakawa .............. G01S 13/84 342/458

(Continued)

FOREIGN PATENT DOCUMENTS

CN 109639325 A 4/2019
CN 112039626 A 12/2020

OTHER PUBLICATIONS

Shang Yaobo, et al., Precise synchronization algorithm for CPM signal based on pilot-aided pre-coding, Journal of Chongqing University of Posts and Telecommunications (Natural Science Edition), 2014, pp. 642-647, vol. 26, No. 5.

(Continued)

*Primary Examiner* — James M Perez
(74) *Attorney, Agent, or Firm* — Bayramoglu Law Offices LLC

(57) ABSTRACT

A random phase modulation method depending on a communication distance is provided. In the method, time synchronization is carried out by means of a transmitter and a receiver, a local random signal is generated, and an original signal to be sent is pre-coded according to a transmission delay and the generated local random signal, such that random phase modulation depending on a communication distance is realized, potential security brought about by positions of the transmitter and the receiver is fully utilized, a receiver at an expected distance position can receive a signal with a correct phase, and a receiver at another distance position receives a signal with a scrambled phase, thereby improving the secure communication capability of a wireless communication system in terms of the dimension of space.

1 Claim, 2 Drawing Sheets

(58) Field of Classification Search
CPC .... H04B 7/0676; H04W 72/50; H04W 72/51; H04L 5/003; H04L 5/0058; H04L 5/0069
See application file for complete search history.

(56) References Cited

U.S. PATENT DOCUMENTS

| | | | | | |
|---|---|---|---|---|---|
| 6,532,271 | B1 * | 3/2003 | Hwang | H04L 27/2278 | 375/345 |
| 6,675,009 | B1 * | 1/2004 | Cook | H04W 64/00 | 455/425 |
| 6,826,607 | B1 * | 11/2004 | Gelvin | G01V 1/22 | 709/224 |
| 8,599,901 | B2 * | 12/2013 | Tsakonas | H04B 1/713 | 375/136 |
| 9,531,430 | B2 * | 12/2016 | Morche | H04L 25/4902 | |
| 10,050,750 | B2 * | 8/2018 | Yang | H04L 5/0007 | |
| 10,151,832 | B2 * | 12/2018 | Mende | G01S 13/343 | |
| 11,336,411 | B2 * | 5/2022 | Wu | H04B 7/06 | |
| 11,476,372 | B1 * | 10/2022 | Mandai | H01L 31/02027 | |
| 11,533,694 | B2 * | 12/2022 | Vermani | H04W 56/0035 | |
| 2001/0017898 | A1 * | 8/2001 | Raheli | H04B 7/005 | 375/265 |
| 2002/0186166 | A1 * | 12/2002 | Spratt | H04W 64/00 | 342/464 |
| 2002/0191690 | A1 * | 12/2002 | Pendergrass | H04L 25/4902 | 375/138 |
| 2003/0054759 | A1 * | 3/2003 | Da | G01S 19/20 | 455/7 |
| 2004/0098502 | A1 * | 5/2004 | Xu | H04L 67/1059 | 709/238 |
| 2005/0013386 | A1 * | 1/2005 | Ojard | H04B 1/719 | 375/316 |
| 2005/0013387 | A1 * | 1/2005 | Ojard | H04B 1/719 | 375/316 |
| 2005/0041746 | A1 * | 2/2005 | Rosen | H04B 1/7163 | 375/242 |
| 2005/0084031 | A1 * | 4/2005 | Rosen | H04B 1/69 | 375/295 |
| 2005/0084033 | A1 * | 4/2005 | Rosen | H04L 27/2601 | 375/295 |
| 2005/0100076 | A1 * | 5/2005 | Gazdzinski | H04B 1/7176 | 375/242 |
| 2007/0105508 | A1 * | 5/2007 | Tong | H04L 1/0625 | 455/562.1 |
| 2007/0111746 | A1 * | 5/2007 | Anderson | H04W 52/223 | 455/127.1 |
| 2009/0086657 | A1 * | 4/2009 | Alpert | H04L 1/1877 | 370/310 |
| 2009/0154625 | A1 * | 6/2009 | Kwak | H04L 27/2684 | 375/359 |
| 2011/0182325 | A1 * | 7/2011 | Abou-Rjeily | H04B 7/04 | 375/E1.001 |
| 2011/0243192 | A1 * | 10/2011 | Tsakonas | H04K 3/41 | 375/136 |
| 2015/0208368 | A1 * | 7/2015 | Khude | H04W 72/51 | 370/336 |
| 2015/0223246 | A1 * | 8/2015 | Yang | H04W 4/12 | 370/329 |
| 2016/0119790 | A1 * | 4/2016 | Sakoda | H04L 5/0058 | 370/254 |
| 2016/0124085 | A1 * | 5/2016 | Mende | G01S 13/347 | 342/109 |
| 2016/0165482 | A1 * | 6/2016 | Yang | H04L 27/26132 | 370/336 |
| 2018/0138993 | A1 * | 5/2018 | Küchler | G01S 13/765 | |
| 2020/0068608 | A1 * | 2/2020 | Ye | H04L 5/0044 | |
| 2020/0136872 | A1 * | 4/2020 | Zhai | H04L 27/2697 | |
| 2020/0137704 | A1 * | 4/2020 | Vermani | H04L 5/0035 | |
| 2020/0412504 | A1 * | 12/2020 | Wu | H04B 7/08 | |
| 2021/0045111 | A1 * | 2/2021 | Zhang | H04L 1/004 | |
| 2022/0391696 | A1 * | 12/2022 | Sahin | H04L 27/12 | |
| 2023/0111314 | A1 * | 4/2023 | Sun | G01S 19/30 | 342/357.68 |
| 2023/0180160 | A1 * | 6/2023 | Vermani | H04W 56/0035 | 370/350 |

OTHER PUBLICATIONS

LG Electronics, CM Increase for PUCCH/DM RS in Non-contiguous Allocation, 3GPP TSG RAN WG1#59, R1-094781, 2009, pp. 1-7.

* cited by examiner

RANDOM PHASE MODULATION METHOD DEPENDING ON COMMUNICATION DISTANCE

CROSS REFERENCE TO THE RELATED APPLICATIONS

This application is the national phase entry of International Application No. PCT/CN2021/090943, filed on Apr. 29, 2021, which is based upon and claims priority to Chinese Patent Application No. 202011213369.2, filed on Nov. 2, 2020, the entire contents of which are incorporated herein by reference.

TECHNICAL FIELD

The present invention belongs to the technical field of telecommunications, and in particular, relates to a random phase modulation method depending on a communication distance.

BACKGROUND

Traditional anti-interception secure communication methods depend on upper-layer encryption and authentication technologies. However, with the improvement of computing power, upper-layer encryption and authentication technologies are facing unprecedented challenges. For example, in September 2019, Google announced that it has achieved "quantum supremacy" for the first time in the world: its quantum computer completed in only 200 seconds the computation that the world's first supercomputer Summit would took 10,000 years to complete, where the computing power has been increased by 1.5 billion times. On the other hand, with the increase of wireless accesses, the distribution and management of secret keys in upper-layer encryption and authentication technologies become increasingly difficult. Based on this background, the physical layer encryption and authentication technology have been extensively and deeply studied. The physical layer encryption and authentication technologies realize encryption and authentication based on the special characteristics of the physical layer, making full use of the characteristics of a physical-layer signal, and has high compatibility with the protocol architecture, and the features of high flexibility and low latency.

Existing physical layer encryption and authentication methods include physical layer watermarking, physical layer challenge response, cross-layer authentication, physical layer key exchange, radio frequency fingerprint, wireless channel fingerprint, etc. Most of the existing physical layer encryption and authentication technologies are based on information theory and utilize the randomness of the channel, while the potential security brought by some other natural factors, such as the positions of a transmitter and a receiver, has not been fully exploited.

SUMMARY

To solve this problem, the present invention provides a physical layer encryption algorithm. Through distance-dependent random phase modulation, a receiver at an expected distance position can receive a signal with a correct phase, and a receiver at another distance position receives a signal with a scrambled phase, thereby improving the secure communication capability of a wireless communication system from the spatial dimension.

To achieve the above objective, the present invention provides a random phase modulation method depending on communication distance, including the following steps:

step 1: performing time synchronization on a transmitter and a receiver, where the transmitter is configured to process and send an original signal, and the receiver is configured to recover a received signal;

step 2: according to a sampling rate $T_s$ arranged in advance, obtaining, by the transmitter and the receiver, a $k^{th}$ sampling time:

$$t_k = t_0 + kT_s$$

where $t_0$ represents an initial sampling time;

step 3: generating, by the transmitter, a local random signal $\theta(t_0)$ at the initial sampling time $t_0$, where $\theta(t_0)$ is uniformly distributed in interval $[0,2\pi)$; generating, by the transmitter, a local random signal $\theta(t_k)$ at the $k^{th}$ sampling time according to a local random signal $\theta(t_{k-1})$ at the previous sampling time, where the generation method is as follows:

$$\theta(t_k) = \rho\theta(t_{k-1}) + \sqrt{1-\rho^2}\chi(t_k)$$

where $\rho$ is a constant in [0,1], $\chi(t_k)$ is a local random signal increment generated by the transmitter at the $k^{th}$ sampling time, and $\chi(t_k)$ has a uniform distribution in the interval $[0,2\pi)$;

step 4: calculating, by the transmitter, a sampling point offset $$\Delta\tau = \left\lceil \frac{\Delta t}{T_s} \right\rceil$$

between the transmitter and the receiver according to the transmission delay $\Delta t$ of the receiver, where $\lceil\ \rceil$ represents a round-up operation; generating, by the transmitter, a precoding signal at the $k^{th}$ sampling time according to the local random signal $\theta(t_{k+\Delta\tau})$ at the $k+\Delta\tau^{th}$ sampling time: $\alpha_k = e^{j\theta(t_{k+\Delta\tau})}$;

step 5: multiplying, by the transmitter, an original signal $s_k$ at the $k^{th}$ sampling time with the precoding signal $r_k$ at the $k^{th}$ sampling time to obtain a transmitting signal $x_k = s_k\alpha_k$ at the $k^{th}$ sampling time, and sending the transmitting signal to the receiver, where the original signal $s_k$ represents a data signal to be sent; and step 6: estimating, by the receiver, the transmitting signal at the $k^{th}$ sampling time to obtain a received signal $r_k$ at the $k^{th}$ sampling time, generating, by the receiver, a local matched signal $\beta_k = e^{-j\theta(t_k)}$ at the $k^{th}$ sampling time according to the local random signal $\theta(t_k)$ at the $k^{th}$ sampling time, and multiplying, by the receiver, the received signal $r_k$ at the $k^{th}$ sampling time with the local matched signal $\beta_k$ at the $k^{th}$ sampling time to obtain an estimation $\hat{s}_k$ of the original signal at the signal $k^{th}$ sampling time.

According to the method provided in the present invention, a transmitter and a receiver generate a local random signal after time synchronization, and an original signal to be sent is pre-coded according to the transmission delay and the generated local random signal, so that communication distance-dependent random phase modulation is realized. The potential security brought by positions of the transmitter and the receiver is fully fulfilled, so that the receiver at the expected distance position can receive a signal with a correct phase, and a receiver at another distance position receives a signal with a scrambled phase, thereby improving the secure communication capability of a wireless communication system from the spatial dimension.

DETAILED DESCRIPTION OF THE EMBODIMENTS

Embodiments of the present invention are described in detail below with reference to the accompanying drawings.

Figure 1:
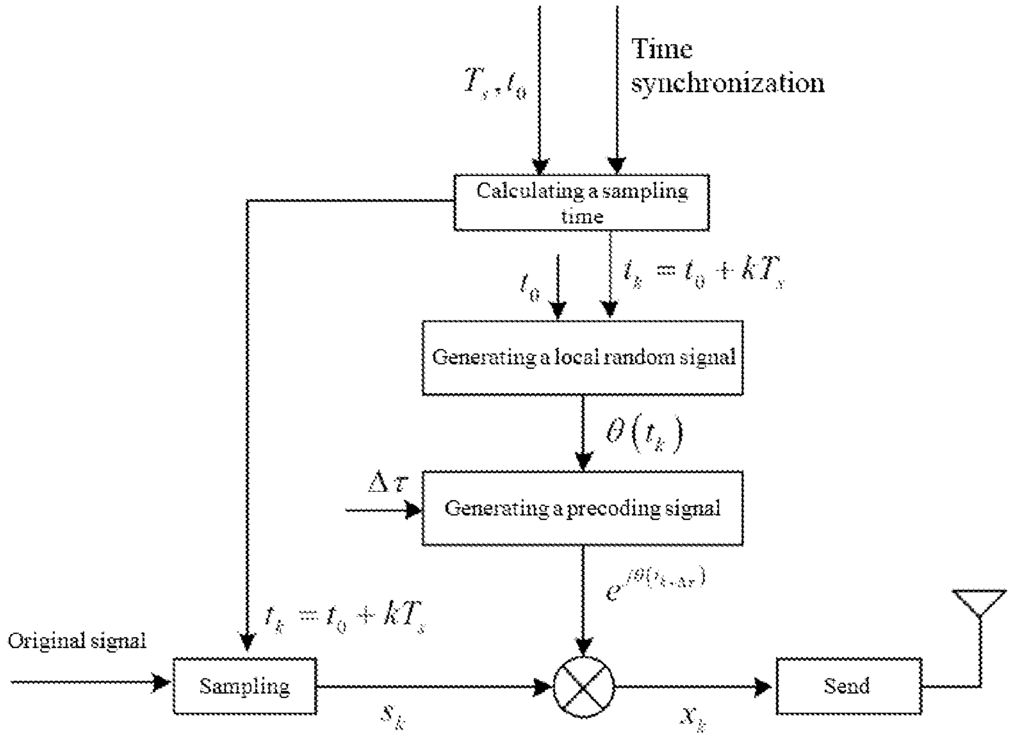
FIG. 1 is a block diagram of signal processing of a transmitter according to the present invention.

A transmitter adopts an architecture shown in FIG. 1. It is assumed that the transmitter and a receiver agree on a sampling rate $T_s$=0.025 μs in advance. An initial sampling time is $t_0$=0. It is assumed that a distance from the transmitter to the receiver is 3 km.

Time synchronization is performed on the transmitter and the receiver.

The transmitter and the receiver obtain a $k^{th}$ sampling time $t_k=kT_s$=0.025 k μs according to the sampling rate $T_S$ agreed in advance.

The transmitter generates a local random signal $\theta(t_0)$ at the initial sampling time at the initial sampling time $t_0$, where $\theta(t_0)$ has a uniform distribution in interval [0,2π). At the $k^{th}$ sampling time, where k=1, 2, 3, . . . , the transmitter generates a local random signal $\theta(t_k)$ at the $k^{th}$ sampling time according to the local random signal $\theta(t_{k-1})$ at the previous sampling time, where the generation method is as follows:

$$\theta(t_k)=\rho\theta(t_{k-1})+\sqrt{1-\rho^2}\chi(t_k)$$

where ρ=0.99, and $\chi(t_k)$ has a uniform distribution in the interval [0,2π).

The transmitter calculates a sampling point offset $$\Delta\tau=\left\lceil\frac{\Delta t}{T_s}\right\rceil=400$$

between the transmitter and the receiver according to a transmission delay Δt=(3 km)/c=10 μs to generate a precoding signal $\alpha_k=e^{j\theta(t_{k+400})}$ at the $k^{th}$ sampling time, where c is a propagation speed of electromagnetic waves in space, and $\theta(t_{k+400})$ represents a local random signal at the $k+400^{th}$ sampling time.

The transmitter multiplies the original signal $s_k$ at the $k^{th}$ sampling time with the precoding signal $\alpha_k$ at the $k^{th}$ sampling time to obtain the transmitting signal $x_k=s_k\alpha_k$ at the $k^{th}$ sampling time, and the transmitting signal is sent to the receiver.

Figure 2:
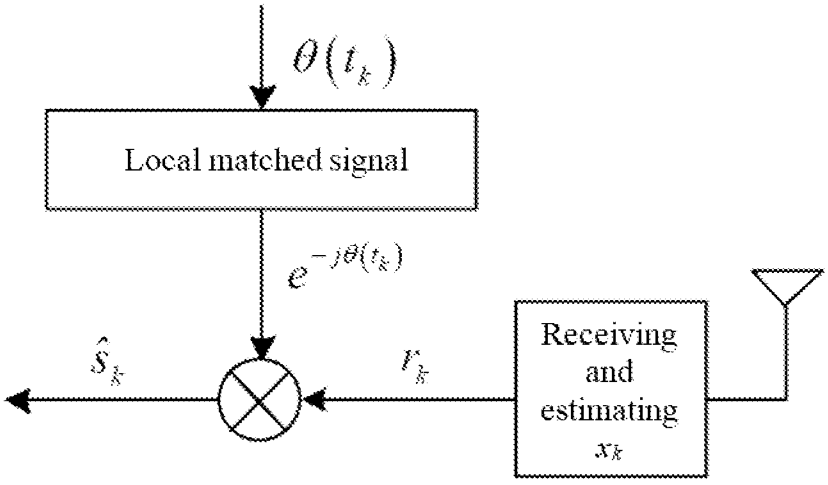
FIG. 2 is a block diagram of signal processing of a receiver according to the present invention.

The receiver adopts an architecture shown in FIG. 2, the receiver estimates the transmitting signal at the $k^{th}$ sampling time to obtain a received signal $r_k$ at the $k^{th}$ sampling time. The receiver generates a local matched signal $\beta_k=e^{-j\theta(t_k)}$ according to the local random signal $\theta(t_k)$ at the $k^{th}$ sampling time. The receiver multiplies the received signal $r_k$ at the $k^{th}$ sampling time with the local matched signal $\beta_k$ at the $k^{th}$ sampling time to obtain an estimation $\hat{s}_k$ of the original signal at the $k^{th}$ sampling time.

Figure 3:
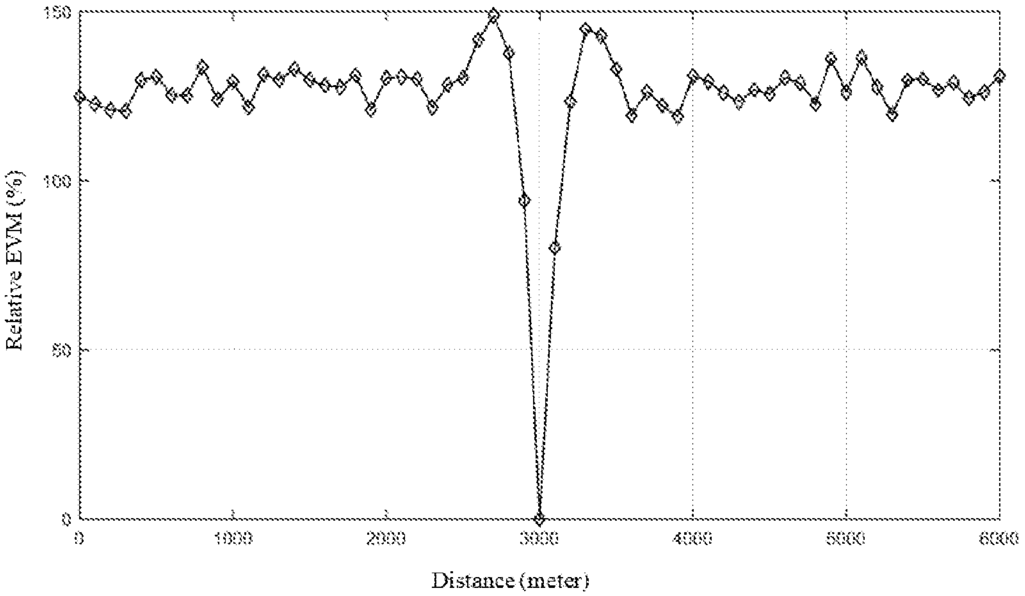
FIG. 3 shows EVM performance of a system described in Embodiment 1.

FIG. 3 shows a relationship between EVM performance of a system described in this embodiment and the transmission distance. It can be seen that only a receiver near an expected distance position of 3 km can receive a signal with a correct phase, and the error vector magnitude (EVM) is equal to 0%; and receivers at other positions receive signals with scrambled phases, and the EVM value is not 0, but greater than 100%.

What is claimed is:

1. A random phase modulation method depending on a communication distance, comprising the following steps:

step 1: performing time synchronization on a transmitter and a receiver, wherein the transmitter is configured to process and send an original signal, and the receiver is configured to recover a received signal;

step 2: according to a sampling rate $T_s$ agreed in advance, obtaining, by the transmitter and the receiver, a $k^{th}$ sampling time:

$$t_k=t_0+kT_s$$

wherein $t_0$ represents an initial sampling time;

step 3: generating, by the transmitter, a local random signal $\theta(t_0)$ at the initial sampling time at the initial sampling time $t_0$, wherein $\theta(t_0)$ has a uniform distribution in an interval [0,2π); generating, by the transmitter, a local random signal $\theta(t_k)$ at a $k^{th}$ sampling time according to a local random signal $\theta(t_{k-1})$ at a previous sampling time, wherein a generation method is as follows:

$$\theta(t_k)=\rho\theta(t_{k-1})+\sqrt{1-\rho^2}\chi(t_k)$$

wherein ρ is a constant on an interval [0,1], $\chi(t_k)$ is a local random signal increment generated by the transmitter at the $k^{th}$ sampling time, and $\chi(t_k)$ has a uniform distribution in the interval [0,2π);

step 4: calculating, by the transmitter, a sampling point offset $$\Delta\tau=\left\lceil\frac{\Delta t}{T_s}\right\rceil$$

between the transmitter and the receiver according to a transmission delay Δt of the receiver, wherein $\lceil\ \rceil$ represents a round-up operation; generating, by the transmitter, a precoding signal at the $k^{th}$ sampling time according to a local random signal $\theta(t_{k+\Delta\tau})$ at a $k+\Delta\tau^{th}$ sampling time;

step 5: multiplying, by the transmitter, an original signal $s_k$ at the $k^{th}$ sampling time with the precoding signal $\alpha_k$ the $k^{th}$ sampling time to obtain a transmitting signal $x_k=s_k\alpha_k$ at the $k^{th}$ sampling time, and sending the transmitting signal to the receiver, wherein the original signal $s_k$ represents a data signal to be sent; and step 6: estimating, by the receiver, the transmitting signal at the $k^{th}$ sampling time to obtain a received signal $r_k$ at the $k^{th}$ sampling time, generating, by the receiver, a local matched signal $\beta_k=e^{-j\theta(t_k)}$ at the $k^{th}$ sampling time according to the local random signal $\theta(t_k)$ at the $k^{th}$ sampling time, and multiplying, by the receiver, the received signal $r_k$ at the $k^{th}$ sampling time with the local matched signal $\beta_k$ at the $k^{th}$ sampling time to obtain an estimation $\hat{s}_k$ of the original signal at the $k^{th}$ sampling time.

* * * * *